(12) United States Patent  
Soh et al.

(10) Patent No.: US 11,177,890 B1  
(45) Date of Patent: Nov. 16, 2021

(54) REMOTE QUANTUM STATE TRANSFER FOR QUBITS WITH DIFFERENT FREQUENCIES

(71) Applicant: National Technology & Engineering Solutions of Sandia, LLC, Albuquerque, NM (US)

(72) Inventors: Daniel Beom Soo Soh, Pleasanton, CA (US); Matt Eichenfield, Albuquerque, NM (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 0 days.

(21) Appl. No.: 17/110,477

(22) Filed: Dec. 3, 2020

(51) Int. Cl.
| | | |
|---|---|---|
| *H04B 10/00* | (2013.01) |
| *H04B 10/70* | (2013.01) |
| *G01P 15/093* | (2006.01) |
| *G06N 10/00* | (2019.01) |
| *H04J 14/00* | (2006.01) |

(52) U.S. Cl.
CPC ............ *H04B 10/70* (2013.01); *G01P 15/093* (2013.01); *G06N 10/00* (2019.01)

(58) Field of Classification Search
CPC ..................................................... H04B 10/70
See application file for complete search history.

(56) References Cited

U.S. PATENT DOCUMENTS

| 7,498,832 | B2 | 3/2009 | Baumgardner et al. |
| 8,983,303 | B2 | 3/2015 | Meyers et al. |
| 9,270,385 | B2 | 2/2016 | Meyers et al. |
| 2019/0020346 | A1* | 1/2019 | Wang ............... B82Y 10/00 |
| 2021/0105135 | A1* | 4/2021 | Figueroa ........... G01B 9/02017 |
| 2021/0159384 | A1* | 5/2021 | Abdo ................... H03D 7/005 |

\* cited by examiner

*Primary Examiner* — Daniel G Dobson  
(74) *Attorney, Agent, or Firm* — Medley, Behrens & Lewis, LLC (57) ABSTRACT

A quantum communication system includes a first quantum transceiver, a second quantum transceiver, and a quantum communication mediator (QCM) system. The transceivers have different resonant frequencies or physical systems. The QCM system receives an initial quantum signal from the first quantum transceiver. The QCM system transfers a quantum state of the initial quantum signal to a first mechanical signal and then from the first mechanical signal to a first pair of optical signals by way of a first three-wave mixing process. The QCM transfers the quantum state to a second pair of optical signals from the first pair by way of a four-wave mixing process. The QCM transfers the quantum state from the second pair of optical signals to a second mechanical signal by way of a second three-wave mixing process. The QCM transfers the quantum state from the second mechanical signal to a final quantum signal by mechanical transduction.

20 Claims, 7 Drawing Sheets

REMOTE QUANTUM STATE TRANSFER FOR QUBITS WITH DIFFERENT FREQUENCIES

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Quantum systems are being theorized and developed for a variety of applications including quantum computing, remote quantum communication, quantum measurement, etc. Various quantum system designs require reliable quantum state transfer between subsystems. For instance, in a quantum communications system, a hybrid quantum-memory, quantum-processor networking system, or a distributed quantum information processing system, quantum states are transferred between devices in the course of performing functionality of the system. However, reliable transfer of quantum states is non-trivial to achieve. For example, while quantum state teleportation protocols have been theorized, such protocols rely on the availability of high-purity entangled qubits, which are difficult to generate as a practical matter.

Practical systems for generating and reading quantum states commonly operate with different resonant frequencies. Conventionally, it has been difficult to transfer quantum states between two systems with different resonant frequencies without losing quantum information. While loss of quantum information can be mitigated by the use of error correction, any loss of quantum information degrades the performance of the system, for instance by reducing the data rate of quantum transfer.

SUMMARY

The following is a brief summary of subject matter that is described in greater detail herein. This summary is not intended to be limiting as to the scope of the claims.

Technologies pertaining to quantum state transfer between systems that have different quantum particle frequencies are described herein. An exemplary quantum state transfer system comprises a first quantum transceiver, a second quantum transceiver, and a quantum communication mediator (QCM) system. The first quantum transceiver is a system that is configured to generate and read quantum states in a first quantum system having a first quantum particle frequency. The second quantum transceiver is a system that is also configured to generate and read quantum states. The second quantum transceiver has a second quantum particle frequency that is different from the first quantum particle frequency of the first quantum transceiver. In a non-limiting example, the first quantum transceiver can be a microwave transceiver that transmits and receives signals having a first microwave frequency and the second quantum transceiver can be a microwave transceiver that transmits and receives signals having a second microwave frequency. In such examples, a qubit can be encoded on the superposing weights of energy eigenstates.

The QCM system is configured to mediate between the disparate-frequency first and second quantum transceivers while preserving a qubit encoded on a quantum state generated by one of the first and second quantum transceivers. The QCM system employs coherent wave-mixing processes to maintain the integrity of encoded quantum information while allowing transformations between frequencies and physical systems, thereby allowing a quantum state to be transmitted over long distances from the first quantum transceiver to the second quantum transceiver, and to be interpretable between the two despite their different resonant frequencies.

In an exemplary embodiment, the QCM system comprises a first mechanical transducer, a first optomechanical resonator, a four-wave-mixing (FWM) resonator, a second optomechanical resonator, and a second mechanical transducer. The first quantum transceiver outputs a first signal having a qubit encoded thereon, wherein the first signal has a first frequency. The first mechanical transducer can be coupled to the first quantum transceiver such that the first mechanical transducer receives the first signal and exhibits a mechanical vibration at the same first frequency of the first signal. Stated differently, the first mechanical transducer converts the qubit from the physical system of the first quantum transceiver to a phononic qubit. The first optomechanical resonator is coupled to the mechanical transducer such that the first optomechanical resonator receives phonons output by the first mechanical transducer. Stated differently, the first optomechanical resonator mechanically vibrates at the same frequency as the first mechanical transducer. Simultaneously, the first optomechanical transducer is pumped by a first optical pumping signal that has a second frequency. The interaction of the first pumping signal and the mechanical vibration in the optomechanical transducer causes the optomechanical transducer to output a first stimulated optical signal that has a third frequency substantially equal to the sum of the phononic frequency and the frequency of the pumping signal.

The first optomechanical resonator is coupled to the FWM resonator by way of an optical channel such that the first pumping signal and the first stimulated optical signal are transmitted over the optical channel to the FWM resonator. The original qubit encoded by the first quantum transceiver is encoded on the amplitude of the first stimulated optical signal and the phase difference between the first stimulated signal and the first pumping signal, which difference remains constant. The FWM resonator receives the first pumping signal, the first stimulated optical signal, and a second pumping signal. The second pumping signal can be generated by a laser that is coupled to the FWM resonator. A FWM interaction of the first pumping signal, the first stimulated signal, and the second pumping signal in the FWM resonator stimulates a second stimulated optical signal. Since energy is conserved in the FWM interaction, the sum of the frequencies of the first stimulated signal and the first pumping signal is substantially equal to the sum of the frequencies of the second stimulated signal and the second pumping signal. The qubit is encoded on the amplitude of the second stimulated signal and the phase difference between the second stimulated signal and the second pumping signal, which is equal to the phase difference between the first pumping signal and the first stimulated signal.

The second stimulated signal and the second pumping signal are transmitted from the FWM resonator to the second optomechanical resonator by way of an optical fiber. The second optomechanical transducer is induced to vibrate by receipt of the second stimulated signal and the second pumping signal. The qubit is encoded on the superposing weights of phonon energy eigenstates associated with the vibration of the second optomechanical resonator. As will be described in greater detail below, a frequency of the vibration of the second optomechanical resonator is based upon the frequencies of the second stimulated signal and the second pumping signal. By appropriate selection of the frequency of the second pumping signal, the frequency of the vibration of the second optomechanical resonator can be controlled to be substantially the same as a resonant frequency of the second quantum transceiver. The vibration of the second optomechanical resonator can be received by a second mechanical transducer. The second mechanical transducer can be configured to convert the mechanical vibration into a signal in a physical system of the second quantum transceiver that has a frequency substantially equal to the resonant frequency of the second quantum transceiver. By way of example, in embodiments wherein the second quantum transceiver is a microwave transceiver, the mechanical transducer can be an electro-mechanical transducer that is configured to convert the mechanical vibration into a microwave signal that is measurable by the second quantum transceiver. Responsive to receipt of the signal from the second mechanical transducer, the second quantum transceiver measures the qubit transmitted by the first quantum transceiver.

In various additional embodiments, and as will be described in greater detail below, some of the various componentry described above as being included in the QCM system may be omitted. By way of example, and not limitation, if one of the quantum transceivers is a phonon quantum memory block that is configured to operate with respect to phononic qubits, it may be unnecessary to include a mechanical transducer to convert a vibration output by an optomechanical resonator from the phononic physical system.

Technologies described herein are suited to transmission of a quantum state from a transmitter to a receiver when the transmitter and receiver operate with different resonant frequencies or in different physical systems. It will be understood by those of skill in the art that appropriate selection of the frequencies of the first pumping signal and the second pumping signal facilitate conversion between substantially any frequencies of the first quantum transceiver and the second quantum transceiver.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to quantum state transfer between disparate-frequency systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

As used herein, the term "physical system" refers to a type of quantum particle and/or a range of frequencies with which a component or system of components is configured to be compatible. By way of example, a mechanical system can include components that are configured to be resonant with respect to phonons of various frequencies. In further examples, an optical or a microwave system can be configured to operate and/or resonate with respect to photons of different frequencies. In non-limiting examples, an optical system can be configured to operate with photons of frequencies between about 300 THz and about 800 THz, whereas a microwave system can be configured to operate with photons of frequencies between about 300 MHz and about 300 GHz. Each of the mechanical system, the optical system, and the microwave system can be considered to operate with respect to different physical systems (e.g., mechanical/phononic, optical, and microwave, respectively). As used herein, a signal is said to be in a given physical system if it is capable of being output, transmitted, received, interpreted, or processed by a device (e.g., a transceiver) that is configured to operate with respect to the given physical system. By way of an example, a signal that is output by a microwave transmitter is said to be in the microwave physical system, whereas an optical signal output by a laser is in the optical physical system but not the microwave physical system.

Figure 1:
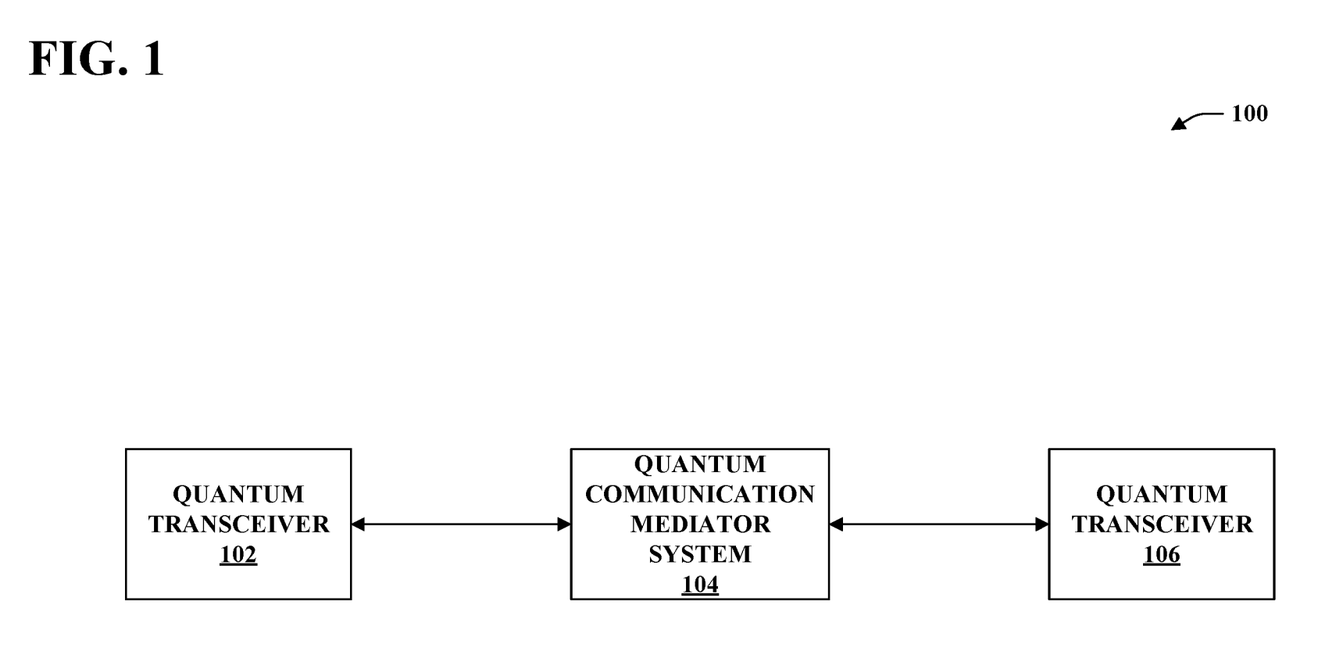
FIG. 1 is a functional block diagram of an exemplary disparate-frequency quantum communications system.

With reference now to FIG. 1, an exemplary quantum system 100 that facilitates transfer of a quantum state between quantum transceivers having different quantum particle frequencies (e.g., resonant frequencies) is illustrated. The system 100 includes a first quantum transceiver 102, a QCM system 104, and a second quantum transceiver 106. The first quantum transceiver 102 and the second quantum transceiver 106 are each configured to prepare and read quantum states according to their respective physical systems and quantum particle frequencies. For example, either or both of the transceivers 102, 106 can be optical photonic transceivers that encode qubits on the superposing weights of photonic energy eigenstates. In other examples, the transceivers 102, 106 can be microwave photonic transceivers that encode qubits on amplitude and phase of microwaves. In still other examples, the transceivers 102, 106 can be transceivers that encode qubits on a ground state and excited state of an atom.

As used herein, a qubit can be mathematically represented as:

$$|\psi\rangle = c_0|0\rangle + c_1|1\rangle \qquad \text{Eq. 1}$$

where $|\psi\rangle$ is the quantum state of the qubit, $|0\rangle$ and $|1\rangle$ are orthonormal basis states, and $c_0$ and $c_1$ are complex-valued probability coefficients associated with the $|0\rangle$ and $|1\rangle$ states, respectively. In an example, for a photonic quantum transceiver, the $|0\rangle$ basis state can be the absence of a photon, whereas $|1\rangle$ is the presence of a photon. In another example, for an atomic quantum system (e.g., an atomic quantum memory device), the $|0\rangle$ state can be a ground state of an atom, whereas the $|1\rangle$ state can be an excited state of the atom. For different physical systems, the basis states $|0\rangle$ and $|1\rangle$ may be different, but quantum information can be transferred from one physical system to another if the coefficients $c_0$ and $c_1$ are maintained from one system to another.

The quantum transceivers 102, 106 may be unable to directly transfer quantum states to one another for any of various reasons. For instance, the quantum particles (e.g., photons, phonons, atoms, or the like) on which the transceivers 102, 106 encode qubits may be subject to large transmission losses. For example, if the quantum transceivers 102, 106 are microwave transceivers, transmission losses over a transmission line longer than about 5 cm may be such that a qubit encoded on a photon by one of the transceivers 102, 106 is indeterminable by the time the photon is received at the other of the transceivers 102, 106. In other instances, the quantum transceivers 102, 106 may employ different physical systems, or be tuned to different frequencies. In such cases, each of the quantum transceivers 102, 106 may be unable to directly read a quantum state prepared by the other of the transceivers 102, 106.

The QCM system 104 is configured to mediate transfer of quantum states between the transceivers 102, 106 by coherent transfer of a quantum state into an optical transmission regime. The QCM system 104 is further configured to mediate transfer of the quantum states by a series of wave-mixing steps that have the effect of transferring a quantum state from a first quantum particle having a first frequency to a second quantum particle having a second frequency. As will be described in greater detail below, elements described herein as being included in the QCM system 104 may or may not be collocated (e.g., embodied by a same physical device, or included in a same physical package). Furthermore, some elements described herein as being included in the QCM system 104 can be collocated with or included in one of the transceivers 102, 106.

Figure 2:
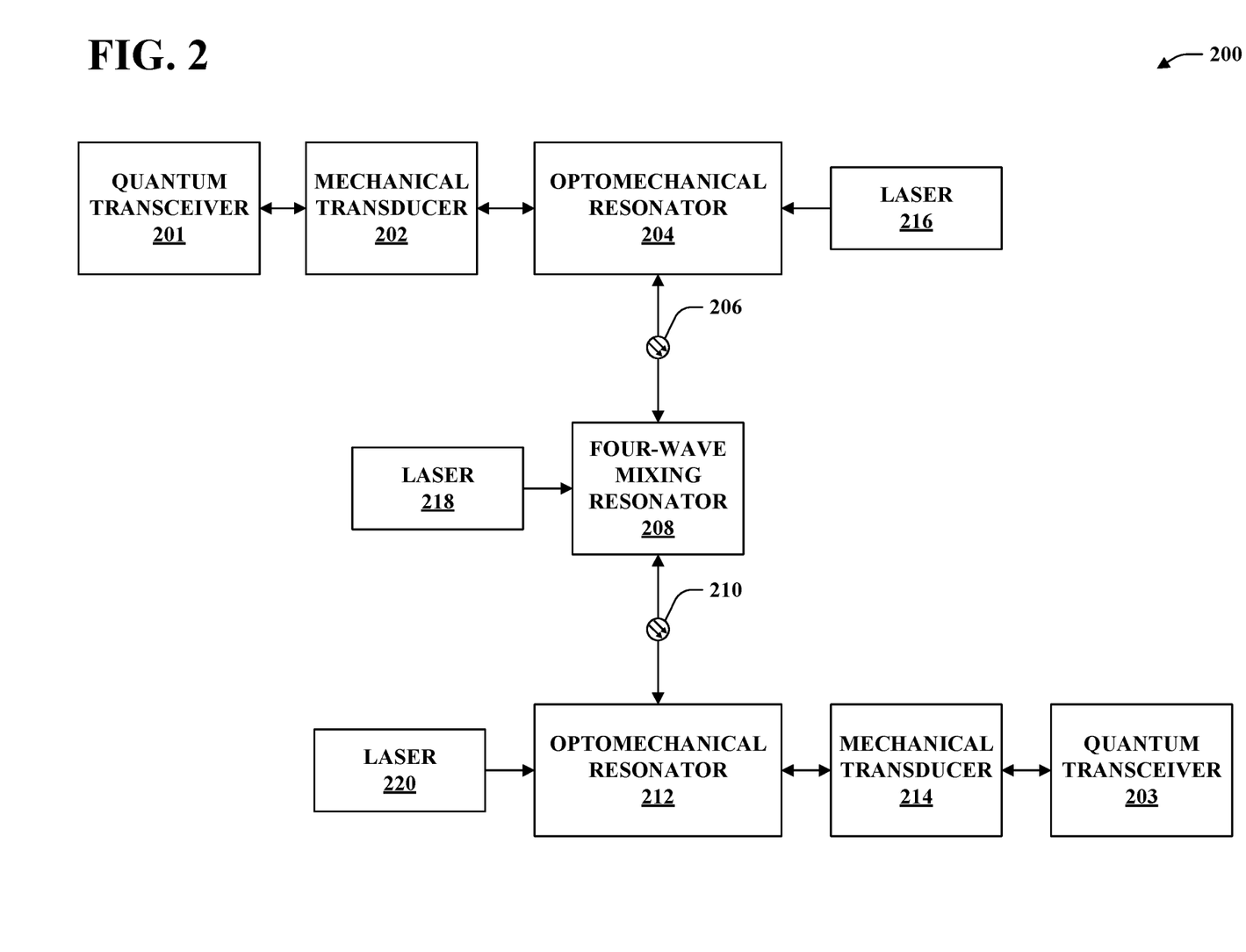
FIG. 2 is a functional block diagram of an exemplary system for mediating quantum communication between transceivers of disparate frequency.

Referring now to FIG. 2, an exemplary quantum communications system 200 that facilitates quantum state transfer between two quantum transceivers that operate with different quantum particle frequencies is illustrated. The system 200 includes quantum transceivers 201, 203. The QCM system 104 is embodied in the system 200 by a variety of components that are collectively configured to mediate transfer of a qubit from the first quantum transceiver 201, operating at a first frequency, to the second quantum transceiver 203, operating at a second frequency. The system 200 further comprises a first mechanical transducer 202, a first optomechanical resonator 204, a first optical channel 206, a FWM resonator 208, a second optical channel 210, a second optomechanical resonator 212, and a second mechanical transducer 214.

Operations of the system 200 in connection with transferring a qubit from the first quantum transceiver 201 to the second quantum transceiver 203 are now described. The first quantum transceiver 201 encodes a qubit on a quantum particle having a first frequency $f_A$. The quantum particle is received by the mechanical transducer 202. The mechanical transducer 202 is configured to transfer the qubit from the quantum particle system of the first quantum transceiver 201 into a phononic vibration having the same frequency $f_A$. By way of example, if the first quantum transceiver is a microwave transceiver, the mechanical transducer 202 can be a piezoelectric electromechanical transducer that converts microwave photons to phonons (i.e., an electromagnetic signal into a mechanical vibration).

Figure 3:
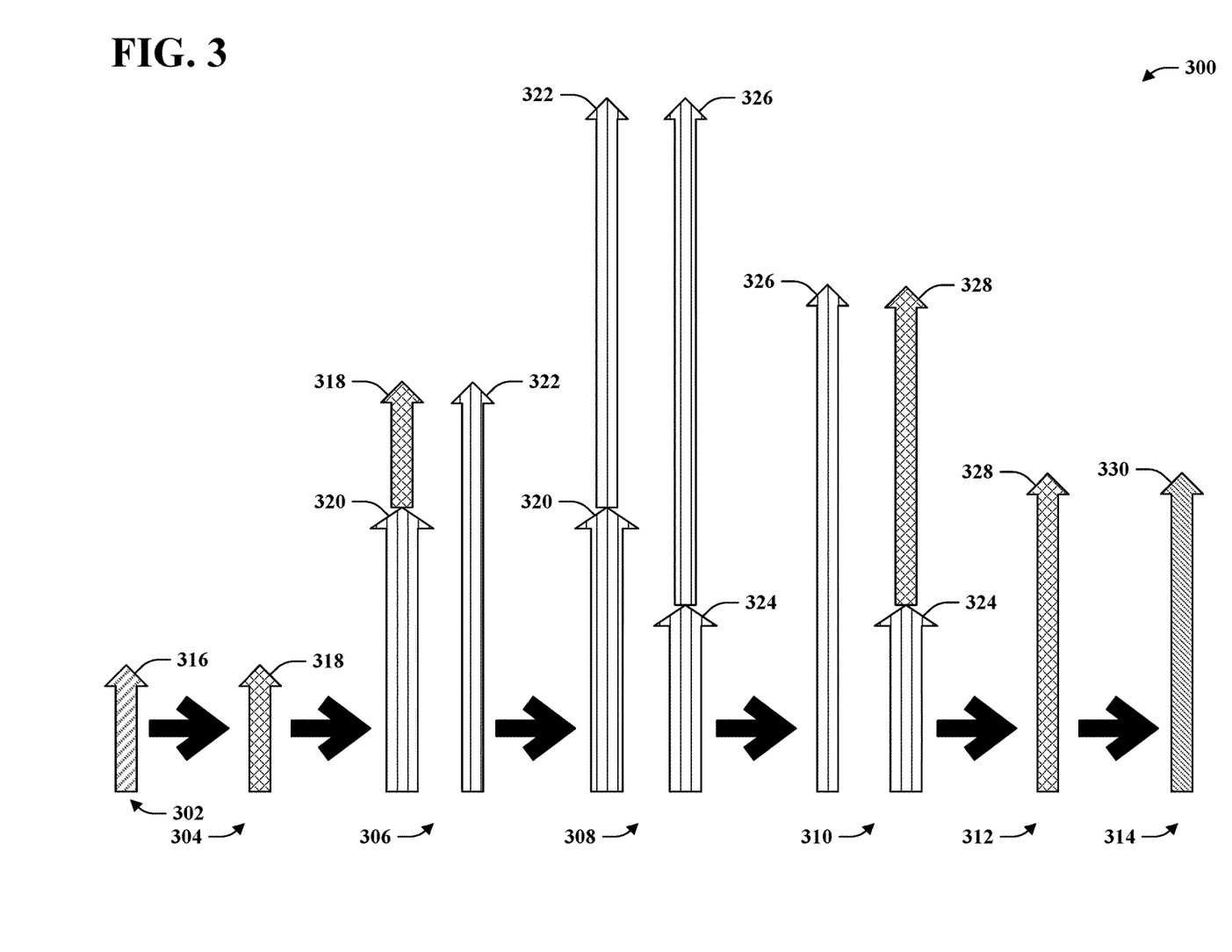
FIG. 3 is an energy-state diagram of signal transitions in a system for mediating quantum communication between transceivers of disparate frequency.

Referring now briefly to FIG. 3, an exemplary energy-state diagram 300 is shown, which depicts various stages 302-314 in the quantum communications system 200. Transitions of a quantum signal between frequencies and physical systems are depicted by arrows 316-330 that are indicative of physical system and frequency of components of the quantum signal at the various stages 302-314. Each of the arrows 316-330 has a shading that is representative of a physical system of a signal component (e.g., mechanical, electrical, microwave, optical, or the like), and a height that is indicative of a magnitude of its frequency. The first stage 302 is represented with a single arrow 316 that represents an initial quantum signal output by the first transceiver 201. The arrow 316 has a first shading indicative of a first physical system used by the quantum transceiver 201 to prepare a quantum state (e.g., a microwave photon), with the frequency $f_A$. The second stage 304 represents the transition from the first physical system of the quantum transceiver 201 to the mechanical vibration of the mechanical transducer 202, which vibration shares the frequency $f_A$. This vibration is represented by arrow 318.

Referring once again to FIG. 2, the mechanical vibration of the mechanical transducer 202 is coupled to the optomechanical resonator 204. The optomechanical resonator 204 therefore vibrates mechanically with the frequency $f_A$. In a mode wherein the quantum transceiver 201 serves as a transmitter, the system 200 can further include a laser 216 that optically pumps the optomechanical resonator 204 with a first pumping signal that has a frequency $g_A$. The optomechanical resonator 204 serves as a three-wave mixing device, and forms a first stimulated optical signal by interaction of the mechanical vibration and the first pumping signal within the optomechanical resonator 204. The first stimulated optical signal has a frequency $h_A$ that is defined by the following energy-conserving relationship:

$$f_A = h_A - g_A \qquad \text{Eq. 2}$$

In general, the frequencies $f_A$ and $h_A$ will be determined by parameters of construction of the quantum transceiver 201 and the optomechanical resonator 204, respectively. For instance, the frequencies $f_A$ and $h_A$ can be respective resonant frequencies of the quantum transceiver 201 and the optomechanical resonator 204. Thus, the frequency $g_A$ of the pumping signal can be appropriately selected such that Eq. 2 is satisfied. The first stimulated optical signal can have a power that is substantially lower than the power of the first optical pumping signal (e.g., three orders of magnitude lower, two orders of magnitude lower, or one order of magnitude lower).

Referring once again to FIG. 3, the stage 306 depicts the three-wave mixing that occurs in the optomechanical resonator 204. Specifically, the stage 306 depicts the mixing of the mechanical vibration of frequency $f_A$, shown as the arrow 318, with the first optical pumping signal $g_A$, depicted by the arrow 320, to generate the first stimulated optical signal with frequency $h_A$, depicted by the arrow 322. The shading of the arrows 320, 322 indicates that they are representative of optical signals (the first optical pumping signal and the first stimulated optical signal, respectively), whereas shading of the arrow 318 indicates that it is representative of a mechanical vibration.

In the three-wave mixing process performed by the optomechanical resonator 204, the quantum information of the original qubit prepared by the quantum transceiver 201 is transferred from a phonon having frequency $f_A$ to photonic signals of the frequencies $h_A$ and $g_A$. As noted above, the quantum information is encoded on the amplitude and phase of the phonon of frequency $f_A$ in an amplitude-phase Hilbert space. Subsequent to the three-wave mixing process, the amplitude of the phonon is transferred to the amplitude of the photon of frequency $h_A$, whereas the phase of the phonon is transferred to the relative phase difference between the two optical waves of frequency $f_A$ and $g_A$. Stated differently, the amplitude of the stimulated photon of the first stimulated optical signal is proportional to the amplitude of the phonon, and the phase difference between the first stimulated optical signal and the first optical pumping signal is substantially the same as the encoded phase. Thus, the full quantum information encoded on the phonon (which information is transferred to the phonon by the interaction in the mechanical transducer 202) is represented collectively by the first stimulated optical signal and the first optical pumping signal in the optomechanical resonator 204.

Referring once again to FIG. 2, the first stimulated optical signal and the first optical pumping signal are output from the optomechanical resonator 204 to an optical channel 206 (e.g., a fiber-optic cable). The optical channel 206 links the optomechanical resonator 204 to the FWM resonator 208. Unlike, for example, microwave or acoustic signals, the first optical pumping signal and the first stimulated optical signal can be transmitted long distances (e.g., tens, hundreds, or thousands of meters) with low loss (e.g., less than 3 dB down).

The FWM resonator 208 receives the first optical pumping signal, having frequency $g_A$, and the first stimulated optical signal, having frequency $h_A$. The FWM resonator 208 further receives a second optical pumping signal from a second pumping laser 218 that is coupled to the FWM resonator 208. The second optical pumping signal has a frequency $g_B$. Pumping of the FWM resonator 208 with the second optical pumping signal of frequency $g_B$ while the resonator 208 receives the first stimulated optical signal of frequency $h_A$ and the first pumping signal of frequency $g_A$ causes a FWM interaction that results in the emergence of a second stimulated optical signal, which has a frequency $h_B$ following the relationship:

$$g_A + h_A = g_B + h_B \qquad \text{Eq. 3}$$

Referring once again to FIG. 3, the stage 308 illustrates the FWM process that occurs in the FWM resonator 208. The arrows 320 and 322 represent the first optical pumping signal and the first stimulated optical signal, respectively. Arrows 324 and 326 represent the second optical pumping signal and the second stimulated optical signal, respectively. The total height of the arrows 320, 322 is depicted equal to the height of the arrows 324, 326, indicating that the sum of the frequencies of the first pumping signal and the first stimulated signal is equal to the sum of the frequencies of the second pumping signal and the second stimulated signal, satisfying Eq. 3.

As will be described in greater detail below, the frequency of the second optical pumping signal $g_B$ can be selected (e.g., by controlling operation of or selecting appropriate componentry of the laser 218) such that quantum information encoded on a qubit by the first quantum transceiver 201 is ultimately transferred to a quantum particle having frequency $f_B$, the operating frequency of the second quantum transceiver 203. In an exemplary embodiment, the frequency of the second optical pumping signal $g_B$ is selected to satisfy:

$$g_B = (g_A + h_A - f_B)/2 \qquad \text{Eq. 4}$$

which satisfies the following equation:

$$h_B - g_B = f_B \qquad \text{Eq. 5}$$

By satisfying Eqs. 4 and 5, the quantum state can be transferred to a signal having the operating frequency of the second quantum transceiver 203, $f_B$.

The FWM that occurs in the FWM resonator 208 is a coherent, phase-preserving wave mixing process. While the phases of the first and second pumping signals can fluctuate individually and independently, the phase difference between the second pumping signal and the second stimulated signal is inherited from and the same as the phase difference between the first pumping signal and the first stimulated signal. Accordingly, the quantum information encoded on the phase difference between the first pumping signal and the first stimulated signal (e.g., by way of the three-wave mixing process that occurs in the optomechanical resonator 204) is transferred to the phase difference between the second pumping signal and the second stimulated signal. The quantum information encoded on the superposing amplitude of the first stimulated signal (frequency $h_A$) is transferred to the superposing amplitude of the second stimulated signal (frequency $h_B$).

The second pumping signal of frequency $g_B$ and the second stimulated optical signal of frequency $h_B$ are transmitted through the second optical channel 210 to the optomechanical resonator 212. The second optical channel 210 can be, for example, an optical fiber, a waveguide, or the like.

Responsive to receipt of the second pumping signal and the second stimulated optical signal, the second optomechanical resonator 212 exhibits a stimulated resonant mechanical vibration of frequency $f_B$ by virtue of a three-wave mixing process that occurs in the resonator 212. The frequency $g_B$ of the second pumping signal can be selected such that the frequency $h_B$ of the second stimulated signal is substantially the same as an optical resonant frequency of the optomechanical resonator 212 to facilitate stimulation of the mechanical vibration. The quantum state encoded on the amplitude of the second stimulated optical signal and the phase difference between the second optical pumping signal and the second stimulated optical signal is transferred to the amplitude and phase of the stimulated mechanical vibration at the second optomechanical resonator 212.

Referring once again to FIG. 3, the three-wave mixing in the second optomechanical resonator 212 is represented by stage 310. Arrows 324 and 326 represent the second pumping signal and the second stimulated optical signal, respectively. The arrow 328 represents the stimulated mechanical vibration of frequency $f_B$. The shading of arrows 324, 326 indicates that the second pumping signal and the second stimulated optical signal are optical signals, whereas the shading of arrow 328 indicates that the stimulated mechanical vibration is a mechanical, or acoustic, signal.

Referring again to FIG. 2, the stimulated mechanical signal is received at the second mechanical transducer 214. The second mechanical transducer 214 is configured such that, responsive to receipt of a mechanical vibration, or signal, at the transducer 214, the transducer 214 outputs a final quantum signal in the same physical system employed by the second quantum transceiver 203. By way of example, and not limitation, the second mechanical transducer 214 can be an electro-mechanical transducer that is configured to output a microwave electromagnetic signal, in embodiments wherein the quantum transceiver 203 is a microwave transceiver. By virtue of appropriate selection of the frequency of the second pumping signal, $g_B$, the signal output by the mechanical transducer 214 has a same frequency $f_B$ as the resonant frequency of the second quantum transceiver 203. Accordingly, the second quantum transceiver 203 can read a quantum state transmitted by the first quantum transceiver 201 from the output of the mechanical transducer 214.

Referring once again briefly to FIG. 3, the transition from the stimulated mechanical signal to the final quantum signal is represented by the transition from stage 312 to stage 314. Stage 312 depicts the arrow 328 which is representative of the stimulated mechanical signal of frequency $f_B$ as received at the mechanical transducer 214. The stage 314 depicts arrow 330, which is representative of the final quantum signal output by the mechanical transducer 214 to the second quantum transceiver 203. The arrow 330 has a same height as the arrow 328 indicating that the stimulated mechanical signal and the final quantum signal have the same frequency $f_B$, whereas the shading of arrow 330 indicates that the final quantum signal is in the physical system of the second quantum transceiver 203. The diagram 300 represents the final quantum signal as being in a different physical system than the initial quantum signal (represented by the arrow 316 at stage 302). However, it is to be understood that the initial quantum signal and the final quantum signal can be in a same physical system.

It is to be understood from the foregoing that each of the quantum transceivers 201, 203 can be operated in either a transmit or receive mode. In an embodiment wherein the second quantum transceiver 203 is configured as a transmitter, the system 200 can include a laser 220. The laser 220 can be used as a pumping laser to provide an optical pumping signal to the optomechanical resonator 212, in similar fashion to the laser 216 providing the first pumping signal to the first optomechanical resonator 204. Thus, a quantum state prepared by the second quantum transceiver 203 can be transmitted to the first quantum transceiver 201 through a reverse order of operations of the system 200 as used to transmit a quantum state from the first transceiver 201 to the second transceiver 203. It is further to be understood that each of the quantum transceivers 201, 203 can change their operation from transmitter to receiver, or vice versa, in real-time during communication between the transceivers 201, 203, using the same equipment shown for the system 200.

The systems 100, 200 facilitate reliable, long-distance quantum state transfer between systems of different operating frequency and/or different physical systems. For example, the system 200 transmits a quantum state from the first transceiver 201 to the second transceiver 203 (or vice versa) by way of an optical channel which is low loss over long distances. Therefore, a quantum state can be exchanged by the transceivers 201, 203 even if the transceivers 201, 203 are positioned far apart and use physical systems (e.g., microwave) that experience high loss over distance. The system 200 also mitigates the difficulty of phase synchronization between the first quantum transceiver 201 and the second quantum transceiver 203. As a practical matter, even if a signal of appropriate frequency and encoded with a quantum state on its amplitude and phase were transmitted directly to the second transceiver 203, the difficulty of phase-matching between the transceivers 201, 203 over distance would make recovery of the quantum state difficult. The system 200 encodes phase information on a quantum state that is represented in an amplitude-phase Hilbert space on a phase difference between optical signals. This phase difference is more robust in transmission through the system 200, and the quantum phase information more readily recoverable from this phase difference.

It is to be understood that various functionality that is described as being performed by the QCM system 104 can instead be performed by either of the quantum transceivers 102, 106. For instance, while the mechanical transducers 202, 214 and the optomechanical resonators 204, 212 are described as being parts of the QCM system 104, these elements can instead be included in devices that perform functionality associated with the quantum transceivers 102, 106. For example, the quantum transceiver 102 can be embodied by a device that includes the transceiver 201, the mechanical transducer 202, the optomechanical resonator 204, and the laser 216 in a same physical package. Similarly, the quantum transceiver 106 can be embodied by a device that includes the laser 220, the optomechanical resonator 212, the mechanical transducer 214, and the quantum transceiver 203 in a same physical package.

Various components of the system 200 are suitable for chip-scale integration, allowing a disparate-frequency quantum communication system to be implemented using existing quantum transceivers. By way of example, the mechanical transducer 202, the optomechanical resonator 204, and the laser 216 can be formed on a same integrated circuit chip. Such a chip can be employed as an interposer between a conventional quantum transceiver and an optical channel that is coupled to an FWM resonator.

In some embodiments, depending on the respective physical systems of the quantum transceivers 201, 203, various components of the system 200 can be omitted. By way of example, and with reference now to FIG. 4, a remote quantum state transfer system 400 is shown, wherein the system 400 is configured to transfer a quantum state between a phononic quantum transceiver 402 and an optical quantum transceiver 404. In exemplary embodiments, the phononic quantum transceiver 402 can comprise a phononic memory block that stores information on phononic qubits. In further embodiments, the optical quantum transceiver 404 can comprise an optical memory block that stores information on optical qubits. The system 400 further includes the optomechanical resonator 204, the optical channel 206, the FWM resonator 208, the optical channel 210, and the lasers 216, 218, connected to one another as described above with respect to FIG. 2.

Figure 4:
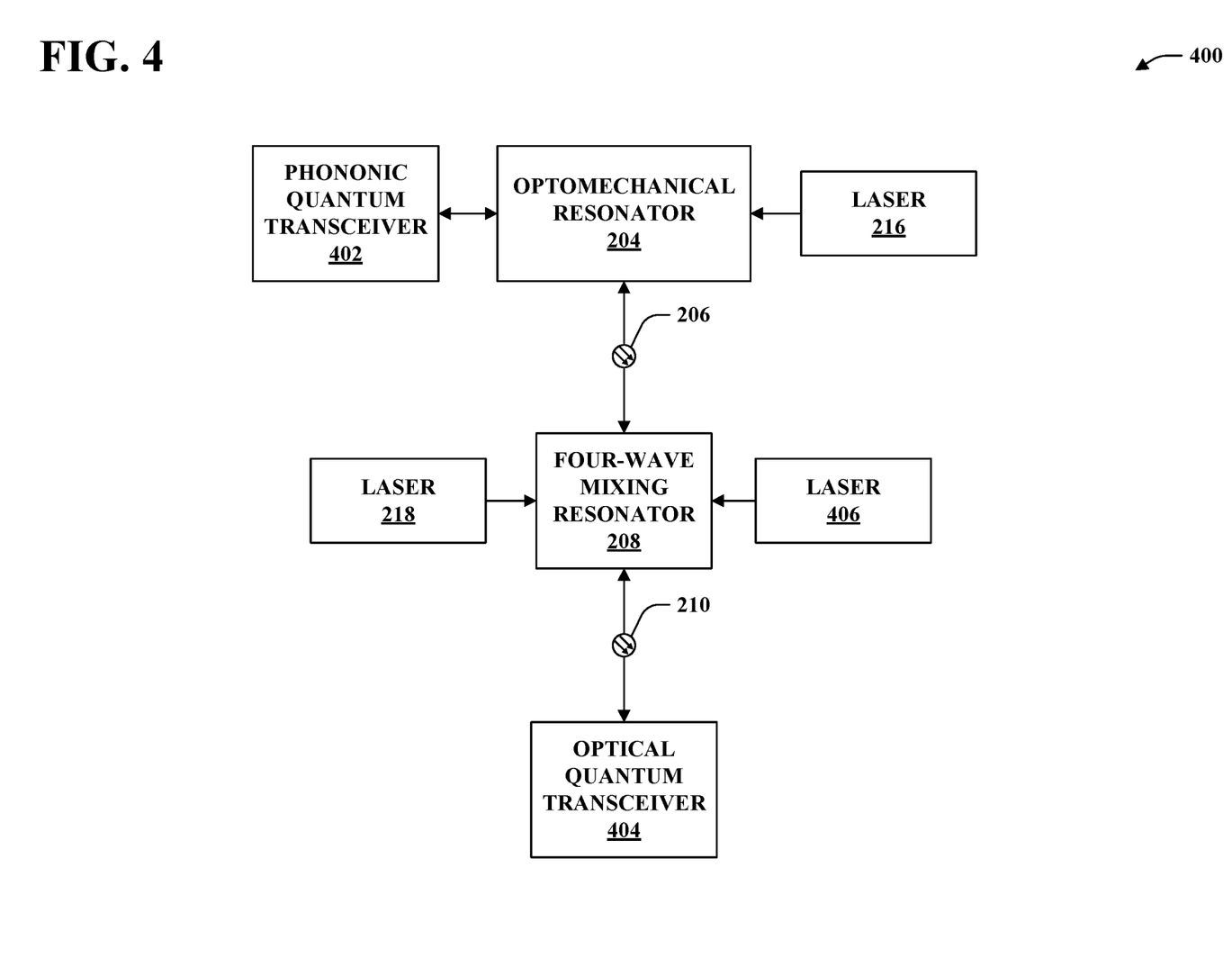
FIG. 4 is a functional block diagram of another exemplary system for mediating quantum communication between transceivers of disparate frequency.

In the system 400, the phononic quantum transceiver 402 is coupled to the optomechanical resonator 204 directly, and outputs a phonon having a qubit encoded thereon, wherein the phonon has the frequency $f_A$. The optomechanical resonator 204 receives the phonon from the phononic transceiver 402 and an optical pumping signal of frequency $g_A$ from the laser 216. The optomechanical resonator 204 outputs the optical pumping signal and a stimulated optical signal of frequency $h_A$ to the optical channel 206. Since the phononic quantum transceiver 402 directly outputs a phonon having a qubit encoded thereon, the mechanical transducer 202 of the system 200 can be omitted from the system 400.

In the system 400, the FWM resonator 208 and its associated pumping laser 218 perform as described above with respect to the system 200. Accordingly, the FWM resonator 208 outputs to the optical quantum transceiver 404, by way of the optical channel 210, a second optical pumping signal and a second stimulated optical signal, wherein these signals have frequencies $g_B$ and $h_B$, respectively. The qubit originally transmitted by the transceiver 402 is completely defined by the second optical pumping signal and the second stimulated optical signal. Therefore, the optical quantum transceiver 404 can measure the qubit directly based upon the second optical pumping signal and the second stimulated optical signal. It is to be appreciated that the frequency $g_B$ of the second optical pumping signal (output by the laser 218) can be selected such that $h_B=f_B$. In other words, the frequency $g_B$ can be selected such that the frequency of the second stimulated optical signal is the same or substantially the same as an operating or resonant frequency of the optical quantum transceiver 404.

In connection with operating the optical quantum transceiver 404 in a transmitting mode, the system 400 can be configured to include an additional pumping laser 406 that is coupled to the FWM resonator 208. In such embodiments, the FWM resonator 208 receives an qubit-encoded optical signal from the optical quantum transceiver 404 and a pumping signal from each of the lasers 218, 406. The FWM process that occurs in the FWM resonator 208 results in the emergence of a stimulated optical signal, which stimulated optical signal is output with one of the optical pumping signals to the optomechanical resonator 204 by way of the optical channel 206. The optomechanical resonator then outputs a phononic signal to the phononic quantum transceiver 402 that has the originally transmitted qubit encoded thereon.

In still other embodiments, a quantum transceiver can be configured to encode, read, or store qubits on atomic states. For example, an atomic transceiver can encode a qubit on probability coefficients for each of a ground state of an atom and an excited state of the atom. In such embodiments, the atomic qubit can be converted to an optical qubit by way of a coherent Raman transition. An atom is pumped with a strong optical pumping signal (e.g., by way of a laser), whereupon the atom emits a photon. The initial coherent superposition of quantum states of the atom is transferred to the output photon by virtue of the coherence of the Raman transition. Therefore, an atomic quantum transceiver can be configured to output photonic qubits by inclusion of a pumping laser configured to perform the coherent Raman transition.

Technologies described herein are also suited to facilitating quantum state transfer between more than two devices. By way of example, and referring now to FIG. 5, an exemplary disparate-frequency quantum communication system 500 is shown, wherein the system 500 includes a plurality of three quantum transceivers 502-506 that are communicatively coupled to a common QCM system 508. Each of the three quantum transceivers 502-506 is configured to prepare and read quantum states with a respective frequency and in a respective physical system. Thus, some or all of the quantum transceivers 502-506 have different resonant frequencies and/or different physical systems.

Figure 5:
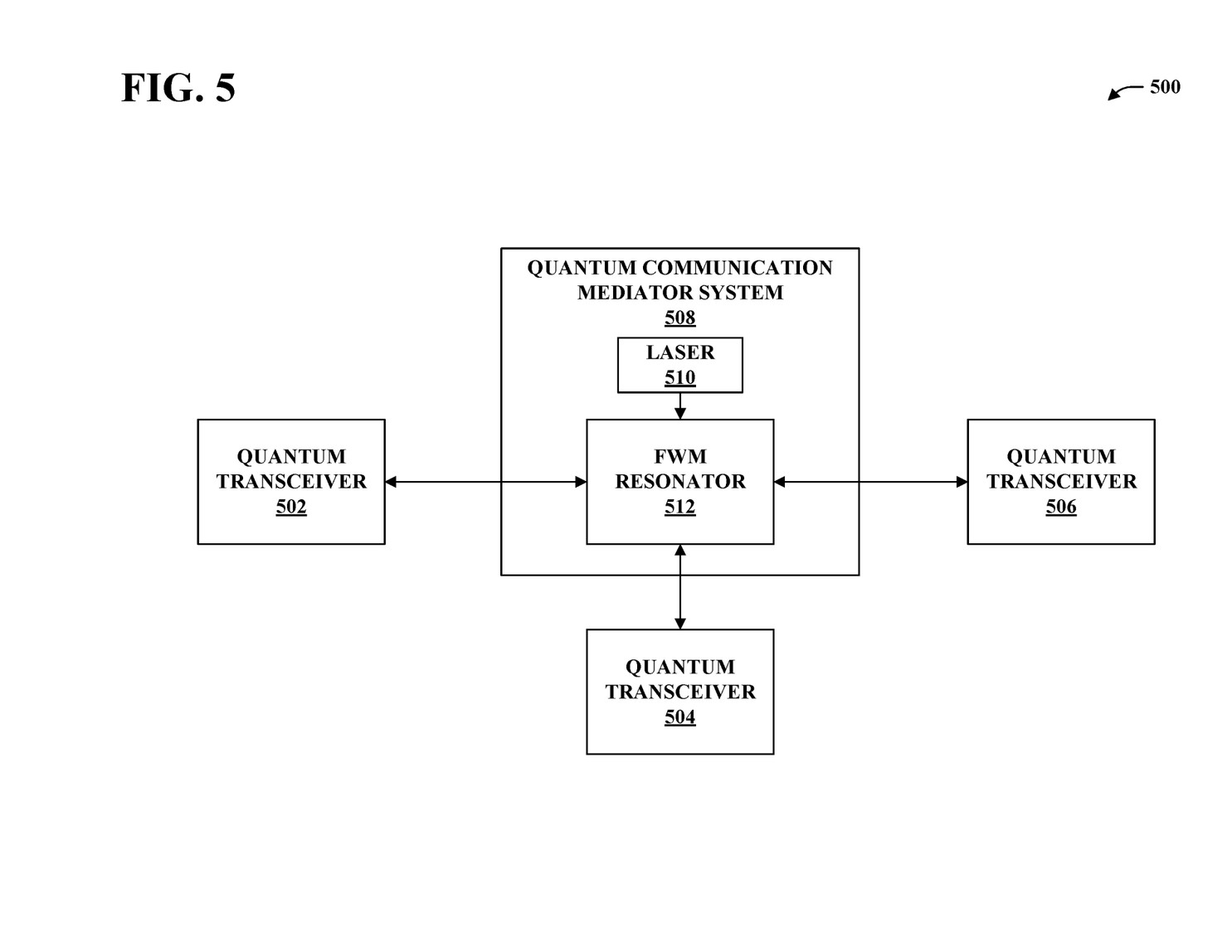
FIG. 5 is a functional block diagram of an exemplary multi-party, disparate-frequency quantum communications system.

In connection with transmitting a quantum state, each of the quantum transceivers 502-506 is configured to output, to the QCM system 508, a respective pair of optical signals that are indicative of a quantum state prepared by the transceiver. By way of example, the quantum transceiver 502 can include the quantum transceiver 201, the mechanical transducer 202, the optomechanical resonator 204, and the laser 216 operating in a manner similar to that described above with respect to FIG. 2. In the example, the quantum transceiver 502 outputs a first optical pumping signal and a first stimulated optical signal (e.g., from the optomechanical resonator 204), wherein the amplitude of the first stimulated signal and the phase difference between the first pumping signal and the first stimulated signal are indicative of a qubit prepared by the quantum transceiver 201.

The QCM system 508 includes a laser 510 and an FWM resonator 512. In an exemplary operation, the QCM system 508 receives a pair of optical signals from one of the quantum transceivers 502-506. For example, the QCM system 508 can receive the first pumping signal and the first stimulated signal from the first quantum transceiver 502. Upon receiving the pair of signals from the quantum transceiver 502 at the FWM resonator 512 (e.g., by way of an optical channel such as an optical fiber), the QCM system 508 can control the laser 510 to output a second pumping signal to the FWM resonator 512. The pumping signal stimulates a four-wave mixing process in the FWM resonator 512, which process stimulates output of a second stimulated optical signal. The QCM system 508 outputs the second stimulated optical signal and the second pumping signal to an intended receiver transceiver in the transceivers 502-506. The intended receiver transceiver (e.g., the transceiver 504) can be configured to measure the qubit prepared by the transceiver 502 based upon the second stimulated optical signal and the second pumping signal. For example, the transceiver 504 can include the optomechanical resonator 212, the mechanical transducer 214, and the quantum transceiver 203 performing as described above with respect to FIG. 2.

In order for the prepared qubit to be measured based upon the second pumping signal and the second stimulated signal by the intended receiver, the QCM system must select an appropriate frequency of the output of the laser 510 based upon the resonant frequency of the intended receiver. For example, if $f_B$ is a resonant frequency of the quantum transceiver 504, $g_A$ is the frequency of the first pumping signal, and $h_A$ is the frequency of the first stimulated signal, the QCM system 508 can transmit the encoded quantum state to the quantum transceiver 504 by selecting the frequency $g_B$ of the second pumping signal output by the laser 510 to satisfy Eq. 4.

Similarly, if $f_C$ is a resonant frequency of the quantum transceiver 506, the QCM system 508 can transmit the encoded quantum state to the quantum transceiver 506 by selecting the frequency $g_B$ of the second pumping signal output by the laser 510 to satisfy:

$$g_B = (g_A + h_A - f_C)/2 \qquad \text{Eq. 6}$$

It is to be appreciated, therefore, that the system 500 can route communications between any pair of transceivers in a plurality of transceivers by appropriate control of a frequency of the pumping laser 510. The QCM system 508 therefore selects the frequency of the pumping signal output by the laser 510 based upon the frequencies of the pair of signals received from the transmitting transceiver, and a resonant frequency of the intended receiving transceiver. In general, if the frequencies of the pumping signal and stimulated signal output by the transmitting transceiver are $g_A$ and $h_A$, respectively, and $f_B$ is the resonant frequency of an intended receiving transceiver, the quantum state can be transferred from the transmitting transceiver to the intended receiving transceiver by selection of $g_B$ to satisfy Eq. 4.

In various embodiments, the QCM system 508 can maintain a ledger that matches identifiers of a plurality of transceivers to their respective resonant frequencies. To transfer a quantum state to an intended receiver, the QCM system 508 can then select an appropriate frequency of the laser 510 based upon the ledger and an identifier of an intended receiver (e.g., a frequency that satisfies Eq. 4).

In other embodiments, responsive to receipt of a pair of signals from one of the transceivers 502-506 acting as a transmitter, the QCM system 508 can sweep the frequency of the laser 510 through a range of frequencies until the intended receiver is able to recover a signal having a same frequency as the resonant frequency of the intended receiver. For instance, and referring once again to FIG. 2, if a frequency of the second pumping signal is not appropriately selected, the second pumping signal and the second stimulated signal either will not cause the optomechanical resonator to exhibit a resonant mechanical vibration or the vibration will have a frequency that is different from the resonant frequency of the transceiver 203 (and thus the mechanical transducer 214 will output an out-of-tune signal to the quantum transceiver 203). In either of these cases, the quantum transceiver 203 is generally unable to measure a qubit either because no signal is received or because the received signal is out of tune. However, if the frequency of the second pumping signal is appropriately selected, the quantum transceiver 203 receives an in-tune signal that has the same frequency as the resonant frequency of the transceiver 203 and is therefore able to measure the qubit. The QCM system 508 can therefore sweep the frequency of the laser 510 through a range of frequencies until a frequency is found that results in an in-tune signal being recoverable by the intended receiver. Accordingly, it is to be understood that the QCM system 508 need not have prior knowledge of resonant frequencies of transceivers 502-506 in order to facilitate communication of a quantum state from one transceiver to another.

Figure 6:
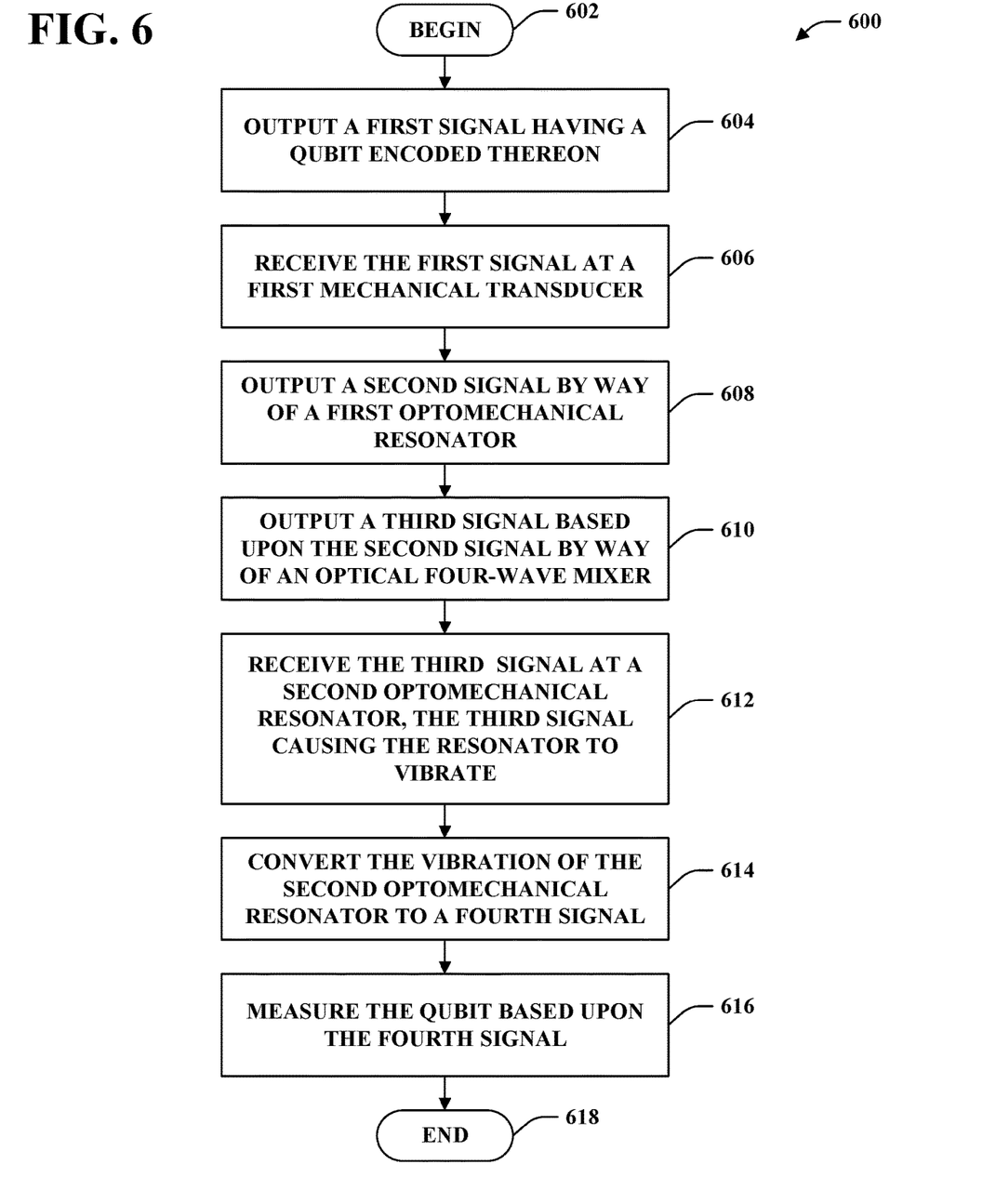
FIG. 6 is a flow diagram that illustrates an exemplary methodology for transferring a quantum state from a first quantum system to a second quantum system of disparate frequency and/or physical system as the first quantum system.

FIG. 6 illustrates an exemplary methodology relating to exchanging a quantum state between quantum systems having different resonant frequencies or physical systems. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 6, a methodology 600 that facilitates transfer of a quantum state from a first quantum transceiver to a second quantum transceiver of disparate frequency or disparate physical system is illustrated. The methodology 600 begins at 602, and at 604, a first signal is output, the first signal having a qubit encoded thereon. The first signal can be output by a first quantum transceiver that is configured to prepare and measure quantum states in a physical system. The first signal has a first frequency that can be, for example, the resonant frequency of the quantum transceiver.

At 606, the first signal is received at a first mechanical transducer. The first mechanical transducer is configured to exhibit a mechanical vibration responsive to receipt of the first signal, wherein a frequency of the vibration is substantially the same as the frequency of the first signal. At 608, in response to receiving the vibration from the first mechanical transducer, a first optomechanical resonator outputs a second, optical signal. The second signal can be made up of two components: a first pumping signal input to the first optomechanical resonator by a laser and a first stimulated signal that is stimulated by three-wave mixing in the first optomechanical resonator. The first pumping signal has a second frequency, whereas the first stimulated signal has a third frequency.

At 610, a third signal is output by way of a four-wave mixer and based upon the second signal. For example, the four-wave mixer can receive the second signal and a second optical pumping signal, wherein a four-wave mixing interaction of the (two-component) second signal with the second pumping signal stimulates a second stimulated optical signal. The second optical pumping signal and the second stimulated signal have respective fourth and fifth frequencies that are different from each other and the frequencies of each of the first pumping signal and the first stimulated signal. The third signal output by the four-wave mixer can comprise the second pumping signal and the second stimulated signal.

At 612, the third signal is received at a second optomechanical resonator, wherein receipt of the third signal causes the second optomechanical resonator to vibrate. At 614, the vibration of the second optomechanical resonator is converted to a fourth signal by way of a second mechanical transducer. The fourth signal has a same frequency as the vibration, which frequency is substantially the same as a resonant frequency of a second quantum transceiver that is the intended recipient of the original qubit. Furthermore, the original qubit is encoded on the fourth signal. Thus, at 616, the second quantum transceiver measures the qubit from the fourth signal, and the methodology 600 ends 618.

Figure 7:
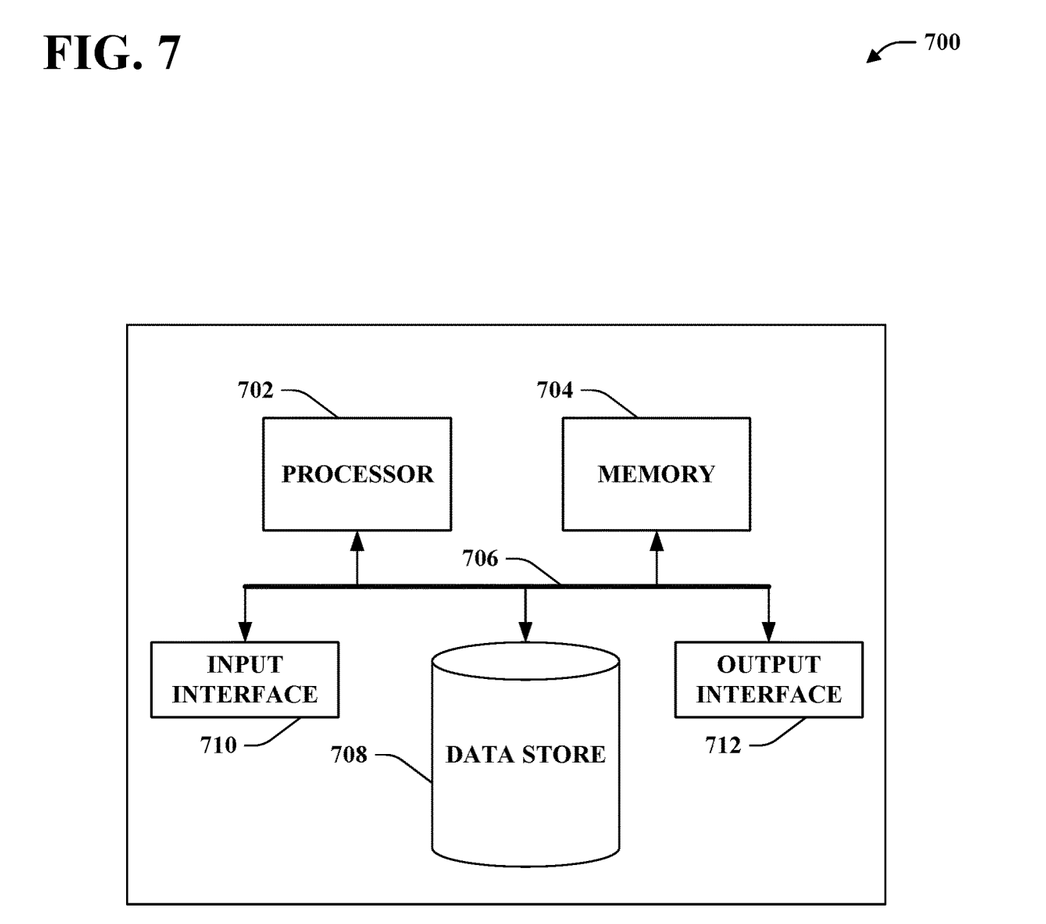
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that controls operation of a quantum transceiver. By way of another example, the computing device 700 can be used in a system that controls operation of one or more lasers to facilitate exchange of a quantum state between disparate-frequency transceivers (e.g., one or more of the lasers 216-220, 406, 510). The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store a ledger of a quantum transceiver identifiers and corresponding resonant frequencies.

The computing device 700 additionally includes a data store 708 that is accessible by the processor 702 by way of the system bus 706. The data store 708 may include executable instructions, a transceiver identifier/resonant frequency ledger, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc., by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A quantum communications system, comprising:
   a first quantum transceiver that is resonant at a first frequency;
   a second quantum transceiver that is resonant at a second frequency; and
   a quantum communication mediator (QCM) system, the QCM system configured to receive a first quantum signal that has the first frequency from the first quantum transceiver, the first quantum signal having a qubit encoded thereon, the QCM system further configured to output a second quantum signal that has the second frequency to the second quantum transceiver, the second quantum signal having the qubit encoded thereon.

2. The quantum communications system of claim 1, wherein the first quantum signal is a first microwave signal, and wherein the second quantum signal is a second microwave signal.

3. The quantum communications system of claim 1, wherein the QCM system comprises a first mechanical transducer, wherein the first mechanical transducer receives the first quantum signal and exhibits a first stimulated mechanical vibration having the first frequency, wherein the QCM system outputs the second quantum signal based upon the first stimulated mechanical vibration.

4. The quantum communications system of claim 3, wherein the QCM system further comprises:
   a first optomechanical resonator; and
   a first pumping laser, wherein responsive to receipt of a first pumping signal output by the first pumping laser and the stimulated mechanical vibration, the first optomechanical resonator outputs a first stimulated optical signal, wherein the QCM system outputs the second quantum signal based upon the first pumping signal and the first stimulated optical signal.

5. The quantum communications system of claim 4, wherein a difference between frequencies of the first stimulated optical signal and the first pumping signal is substantially equal to the first frequency.

6. The quantum communications system of claim 4, wherein the first mechanical transducer and the first optomechanical resonator are formed on a same integrated circuit chip.

7. The quantum communications system of claim 4, wherein the QCM system further comprises:
   a second pumping laser that outputs a second pumping signal; and
   a four-wave-mixing resonator that receives the first stimulated optical signal, the first pumping signal, and the second pumping signal, and outputs the second pumping signal and a second stimulated optical signal, the QCM system configured to output the second quantum signal based upon the second pumping signal and the second stimulated optical signal.

8. The quantum communications system of claim 7, wherein a difference between frequencies of the second stimulated optical signal and the second pumping signal is substantially equal to the second frequency.

9. The quantum communications system of claim 7, wherein the QCM system further comprises:
   a second optomechanical resonator, wherein responsive to receipt of the second pumping signal and the second stimulated optical signal, the second optomechanical resonator exhibits a second stimulated mechanical vibration, the second stimulated mechanical vibration having the second frequency, and wherein the QCM system outputs the second quantum signal based upon the second stimulated mechanical vibration.

10. The quantum communications system of claim 9, wherein the QCM system further comprises:
    a second mechanical transducer, the second mechanical transducer configured to receive the second stimulated mechanical vibration and to output the second quantum signal.

11. The quantum communications system of claim 9, wherein the second mechanical transducer and the second optomechanical resonator are formed on a same integrated circuit chip.

12. A system for mediating quantum communications, comprising:
    a pumping laser; and
    a four-wave-mixing (FWM) resonator, the FWM resonator coupled to a first optical channel and a second optical channel, wherein the FWM resonator receives a first optical signal and a second optical signal from the first optical channel, a qubit being encoded on a first phase difference between the first optical signal and the second optical signal and an amplitude of the first optical signal, wherein further the FWM resonator is configured to receive a third optical signal from the pumping laser, and wherein responsive to receipt of the first optical signal, the second optical signal, and the third optical signal, the FWM resonator outputs the third optical signal and a fourth optical signal to the second optical channel, wherein the qubit is encoded on a second phase difference between the third optical signal and the fourth optical signal and an amplitude of the fourth optical signal.

13. The system of claim 12, further comprising:
    a first quantum transceiver having a first resonant frequency, the first quantum transceiver configured to output the first optical signal and the second optical signal to the first optical channel such that the qubit is encoded thereon; and
    a second quantum transceiver having a second resonant frequency, the second quantum transceiver configured to receive the third optical signal and the fourth optical signal from the second optical channel and to measure the qubit based upon the third optical signal and the fourth optical signal.

14. The system of claim 13, wherein a difference between a frequency of the first optical signal and a frequency of the second optical signal is substantially equal to the first resonant frequency.

15. The system of claim 13, wherein a difference between a frequency of the third optical signal and a frequency of the fourth optical signal is substantially equal to the second resonant frequency.

16. A method, comprising:
    outputting a first signal having a qubit encoded thereon, the first signal having a first frequency;
    receiving the first signal at a first mechanical transducer, the first mechanical transducer configured to vibrate responsive to receipt of the first signal;
    responsive to receiving the vibration of the first mechanical transducer at a first optomechanical resonator, outputting, by way of the first optomechanical resonator, a second signal, the second signal being an optical signal that comprises a first component having a second frequency and a second component having a third frequency;
    receiving the second signal at an optical four-wave mixer, wherein the optical four-wave mixer is configured such that responsive to receipt of the second signal, the optical four-wave mixer outputs a third signal, the third signal being an optical signal that has a third component having a fourth frequency and a fourth component having a fifth frequency;
    receiving the third signal at a second optomechanical resonator, wherein receipt of the third signal causes the second optomechanical resonator to vibrate;
    converting, by way of a second mechanical transducer, the vibration of the second optomechanical transducer into a fourth signal, the fourth signal having the qubit encoded thereon, the fourth signal having a sixth frequency; and
    measuring the qubit from the fourth signal by way of a quantum transceiver, the quantum transceiver having a resonant frequency substantially the same as the sixth frequency.

17. The method of claim 16, wherein the fourth signal is a microwave signal.

18. The method of claim 16, wherein the first frequency is different from the fifth frequency.

19. The method of claim 16, wherein one of the second frequency or the third frequency is an optical resonant frequency of the first optomechanical resonator.

20. The method of claim 16, wherein one of the fourth frequency or the fifth frequency is an optical resonant frequency of the second optomechanical resonator.

* * * * *